Feb. 19, 1957  H. GANGER  2,781,603
COMBINED MINIATURE CHUM POT, LURE AND SINKER
Filed June 3, 1955
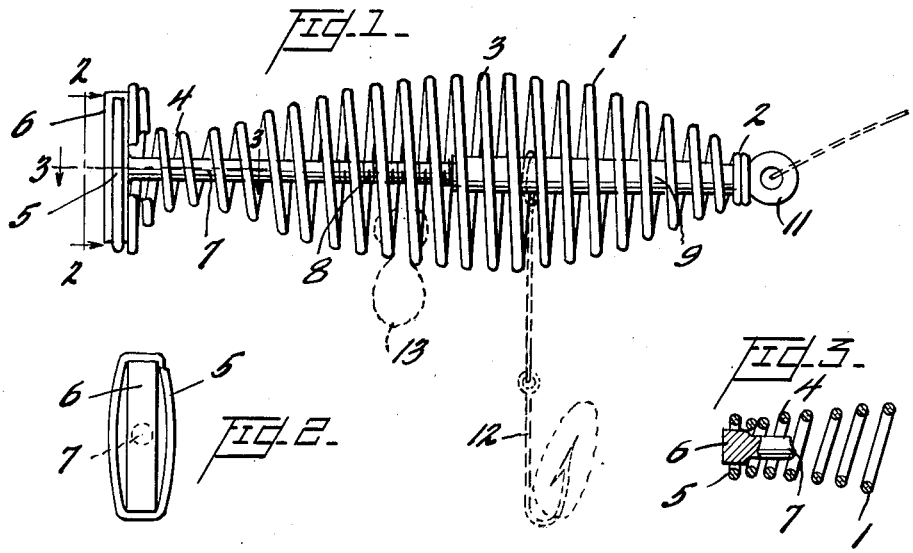
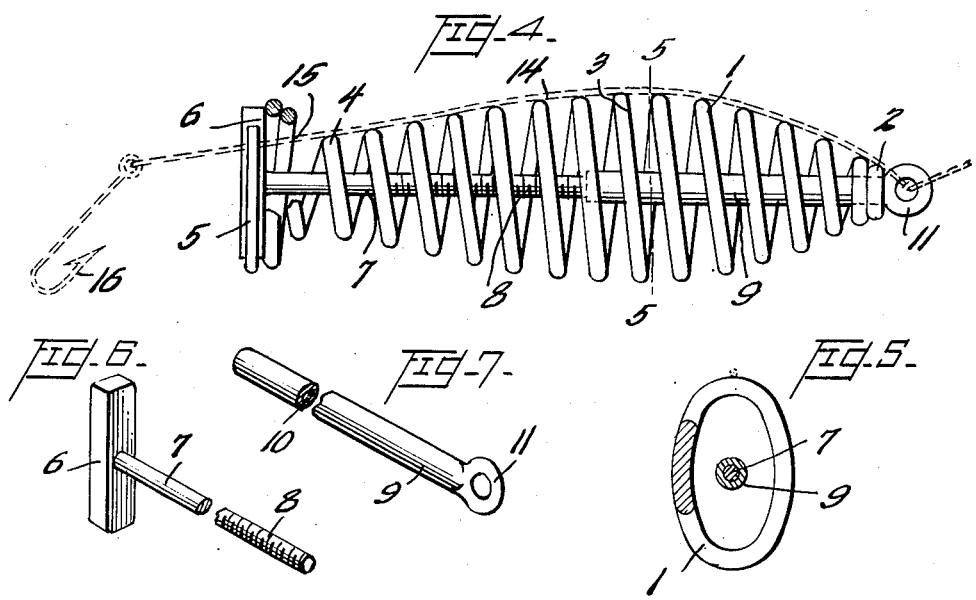
INVENTOR
Harry Ganger,
BY Parker Cook
ATTORNEY

United States Patent Office 2,781,603
Patented Feb. 19, 1957

2,781,603

COMBINED MINIATURE CHUM POT, LURE, AND SINKER

Harry Ganger, Atlantic City, N. J.

Application June 3, 1955, Serial No. 513,132

1 Claim. (Cl. 43—41)

My invention relates to a new and useful improvement in a combined miniature chum pot, lure and sinker.

Within the last few years fishermen, especially along the Atlantic coast have found it an advantage to have a miniature chum pot connected to the line near the hook, this chum pot in turn holding bloodworms, pieces of fish, mussels, clams, etc., so that the oil from this chum will tend to attract the fish.

One of the objects of the present invention is to provide a combined miniature chum pot which can also be used as a lure or a sinker so that it does away with the necessity of buying an extra chum pot if used with an ordinary sinker or, as known along the Jersey coast, a "dipsy."

Still another object of the invention is to provide a combined miniature chum pot and lure that is preferably made of stainless steel and formed with a number of convolutions and an adjustable bolt extending through the combined chum pot, lure and sinker, so that when it is desired to place bloodworms, or clams, etc., in the same, it is only necessary to turn the bolt anti-clockwise to thus let the convolutions spread so that the chum can be inserted anywheres inside, that is, through the convolutions, and after which the bolt can be tightened to bring the convolutions closer together.

Still another object of the invention is to provide the device as above described that may be made of plastic rather than of stainless steel, so that the same may be highly colored and perhaps be a more efficient lure than if it were made of stainless steel.

Still another object of the invention is to provide a combined miniature chum pot, lure and sinker, so that it may be used as a lure if trolling for the pelagic fish, or, it may be used on the bottom for the bottom fish, with the chum placed within the lure when fishing for king fish, or flounder, fluke, and other bottom fish.

Still another object of the invention is to form this combined miniature chum pot, lure and sinker so that it will act as a sinker for surf casters, and may be made to weigh preferably four or five ounces, as this is the conventional weight for a sinker or "dipsy," as used along the Jersey coast.

With these and other objects in view, the invention consists in certain new and novel arrangements and combination of parts as will be hereinafter more fully described as the specification proceeds.

Referring now to the drawings, showing a preferred and two modified forms,

Fig. 1 is a view in side elevation of the miniature chum pot, lure and sinker, as consisting of a plurality of convolutions of stainless steel wire with a regulating bar extending through the same, and a hook being associated with the bar, Fig. 2 is an end view on line 2—2 of Fig. 1, Fig. 3 is a fragmentary, horizontal section taken on line 3—3 of Fig. 1, Fig. 4 is a view similar to Fig. 1, showing a slight modification, as in this instance, rather than forming the convolutions of stainless steel, they are formed of plastic; and the hook as shown as being secured to the eye and passing out through the tail, so that it can be used for trolling, Fig. 5 is a sectional view taken on line 5—5 of Fig. 4, Fig. 6 is a perspective of the end plate and bolt as shown in Figs. 1 and 4, Fig. 7 is a perspective of the socket and eye in which the bolt is threaded, and Fig. 8 is a side elevational view, showing a slight modification wherein rather than the miniature chum pot, lure and sinker being a fish shape, it is of the shape of two cones with their bases placed opposite each other.

Referring now for the moment to Fig. 1, there is shown the combined miniature chum pot, lure and sinker, which for brevity's sake will hereinafter be called the "lure," consisting of a stainless steel wire 1, which in turn is formed into a plurality of convolutions, the convolutions being small at the forward end as at 2, then increasing in size to about the middle as at 3, and then slowly decreasing in size again to the rear end as at 4, and then the last strand 5 being enlarged to encompass the end plate 6 of a bolt 7, as will hereinafter be mentioned.

Referring now to Figs. 6 and 7, there is shown the bolt 7 which is externally threaded as at 8 and has the end plate 6 which is greater in length than the diameter of the convolutions at 4 but about which the last strand 5 of the convolutions is to encircle so that the end plate 6 can not turn unless the convolutions are first pushed closer together at this end.

In Fig. 7 there is shown the socket 9 which is internally threaded as at 10 to receive the threads 8 of the bolt 7, and at the forward end of the socket 9 is the eye 11, which is of a greater diameter than the external diameter of the convolutions 2 of the spring 1 at the forward end of the lure.

The socket 9 is to be passed centrally through the lure and then the bolt 7 is also passed from the rear centrally through the lure so that the threads 8 are within the socket 9 and the last strand 5 will fit over the end plate 6.

To place the chum inside the lure the end strand 5 will be pushed forwardly and the end plate 6 turned anti-clockwise so that the convolutions may be further apart. The chum will then be inserted between the convolutions and again the end plate 6 turned in a clockwise direction to tighten up the convolutions so that the chum can not escape from within the lure.

A hook 12 or a plurality of hooks may be fastened to the bolt 7 or socket 9 any place throughout the length of the lure.

In Fig. 1 I have shown in dotted lines the hook 12, which may be secured about the socket 9; and I have also shown in dotted lines as at 13 some of the chum extending between the convoluitons.

In Fig. 4, the lure is supposed to be formed of plastic, and the diameter of the plastic convolutions will be a little larger than the diameter of the stainless steel wire, but otherwise the structure is the same.

I have shown in Fig. 7, however, the snell or gut leader 14 of a hook fastened through the eyelet 11, extending back over the convolutions and then as at 15 passed in through the convolutions and then extending out of the rear to one side of the end plate 6, so that here the device is used as a lure; and the hook 16 might have a piece of pork rind thereon, or rubber hose, or, even bait.

It is not thought a more specific description is needed of the form shown in Fig. 4 as the only difference here is that rather than using stainless steel wire, a plastic is used, which might be of a solid color, or of various colors, as some authorities hold that yellow or red will tend to attract fish.

A hook may be fastened through the form as shown in Fig. 1 similar to the way shown in Fig. 4.

Referring now to the modification as shown in Fig. 8, there is shown the convolutions 17 which are of a rather smaller diameter at the forward end 18, increase in size at 19, and then decrease in size again as at 20, where the end plate 21 and its bolt 22 will fit in the socket 23, having its eyelet as at 24. The end strand 26 will in turn encircle the end plate 21, the thought being in the modification, that probably a surf caster could cast this form of lure (combined miniature chum pot, lure and sinker) in place of the forms shown in Figs. 1 and 4.

From the foregoing, it will be seen that I have provided a combined miniature chum pot, lure and sinker which may be filled with chum and wherein the convolutions may be pulled or spread apart so that chum may be inserted by simply pushing the end strand and the convolutions towards the forward end of the lure, and then the end plate turned clockwise so that the convolutions will be close enough to prevent the chum from coming from within the lure.

Another advantage of this combined miniature chum pot, lure and sinker is that should the same become wedged between rocks, a strong pull on the line will compress the convolutions and then by quickly releasing the line the lure is likely to jump backward and thus clear itself, so that where an ordinary sinker or lure would be lost, this form can oftentimes be saved.

As heretofore mentioned, the bolt and socket can be made heavy enough so that with the plastic or spring convolutions the lure will weigh from four to five ounces, or even greater, so that it conforms to the weight of the sinker that is usually used in surf casting. In actual practice I make the bolt and socket so that the same may have an adjustable movement from three to six inches.

It will also be understood that by having the last strand encircle the end plate, there is no possibility of the same loosening in fishing; but the end strand will have to be pushed forward so that the bolt may be tightened or loosened, as desired.

Having thus described my invention, what I claim is new and desire to secure by Letters Patent is:

A combined miniature chum pot, lure and sinker, including a multiplicity of convolutions formed from a strand of spring metal, the convolutions at the forward end being of reduced diameter, and increasing in diameter towards the center of the combined miniature chum pot, lure and sinker, then decreasing in diameter towards the rear end thereof; and adjustable socket and bolt within the convolutions; the socket having a large eyelet at its forward end and of no greater diameter than the diameter of the adjacent convolution; an end plate at the end of the bolt and of greater length than width, the end plate being of less length than the diameter of the adjacent convolution; and the last strand of the convolutions encircling the end plate so that the bolt can not be turned until the last strand has been moved to a position towards the forward end of the combined miniature chum pot, lure and sinker, the space between the adjustable socket and bolt and convolutions being of such size as to receive chum therein.

References Cited in the file of this patent

UNITED STATES PATENTS

| | | |
|---|---|---|
| 710,344 | Swinscoe | Sept. 30, 1902 |
| 1,338,856 | Cote | May 4, 1920 |
| 1,516,174 | Cox | Nov. 18, 1924 |
| 2,087,067 | Nampa | July 13, 1937 |
| 2,375,357 | Friedman | May 8, 1945 |